United States Patent
Young (10) Patent No.: US 8,305,183 B2
(45) Date of Patent: Nov. 6, 2012

(54) TRANSFORMER FOR MULTI-OUTPUT POWER SUPPLIES

(75) Inventor: George Young, Blackrock (IE)

(73) Assignee: Texas Instruments (Cork) Limited, Dublin (IE)

( * ) Notice: Subject to any disclaimer, the term of this patent is extended or adjusted under 35 U.S.C. 154(b) by 0 days.

(21) Appl. No.: 12/282,323

(22) PCT Filed: Mar. 12, 2007

(86) PCT No.: PCT/IE2007/000033
§ 371 (c)(1),
(2), (4) Date: Apr. 3, 2009

(87) PCT Pub. No.: WO2007/105187
PCT Pub. Date: Sep. 20, 2007

(65) Prior Publication Data
US 2009/0219124 A1 Sep. 3, 2009

(30) Foreign Application Priority Data
Mar. 10, 2006 (IE) .................................... 2006/0182

(51) Int. Cl.
  H01F 17/04 (2006.01)
  H01F 27/24 (2006.01)
  H01F 21/02 (2006.01)
  H01F 27/28 (2006.01)
(52) U.S. Cl. ........ 336/221; 336/212; 336/147; 336/170; 336/180; 336/184; 336/222
(58) Field of Classification Search .................. 336/131, 336/147, 170, 180, 182–184, 220–222, 150, 336/192
See application file for complete search history.

(56) References Cited

U.S. PATENT DOCUMENTS

| 4,167,719 A | * | 9/1979 | Forge .............................. 336/77 |
| 5,999,078 A | | 12/1999 | Herbert | |
| 6,114,924 A | * | 9/2000 | Cain et al. ..................... 333/112 |

(Continued)

FOREIGN PATENT DOCUMENTS

| GB | 131026 | 8/1919 |
| GB | 2146492 A | 4/1985 |
| GB | 2285892 A | 7/1995 |

OTHER PUBLICATIONS

Chen, Integration of Electromagnetic Passive Components in DPS Front-End DC/DC Converter—A Comparative Study of Different Integration Steps.

(Continued)

*Primary Examiner* — Mohamad Musleh
*Assistant Examiner* — Mangtin Lian
(74) *Attorney, Agent, or Firm* — William B. Kempler; Wade J. Brady, III; Frederick J. Telecky, Jr.

(57) ABSTRACT

This invention relates to a transformer (1) for multi-output power supplies such as those commonly found in electronic equipment. The transformer comprises a magnetic core (3) and a plurality of windings (5, 7, 9) at least some of which are fractional windings, arranged about the magnetic core. The transformer comprises a dual transformer structure with a pair of transformers, a main transformer (11) and an auxiliary transformer (13). In a preferred embodiment, the main transformer and the auxiliary transformer are connected together. In this way, readily available magnetic components may be used in the construction of the transformer and the simple construction allows for a large cross-sectional area of transformer to be deployed so that reduced turn counts of windings may be used.

23 Claims, 6 Drawing Sheets

U.S. PATENT DOCUMENTS

| | | |
|---|---|---|
| 6,348,848 B1 | 2/2002 | Herbert |
| 6,380,834 B1 * | 4/2002 | Canzano et al. ............. 336/200 |
| 6,380,836 B2 * | 4/2002 | Matsumoto et al. .......... 336/200 |
| 6,927,661 B2 * | 8/2005 | He et al. ........................ 336/200 |
| 6,965,280 B2 * | 11/2005 | Chen ............................ 333/131 |
| 7,123,123 B2 * | 10/2006 | Isurin et al. ................... 336/200 |
| 7,280,026 B2 * | 10/2007 | Chandrasekaran et al. .. 336/212 |
| 2004/0093718 A1 * | 5/2004 | Takeuchi et al. ............. 29/602.1 |
| 2006/0038650 A1 * | 2/2006 | Mehrotra et al. ............... 336/83 |

OTHER PUBLICATIONS

GB Examination Report under Section 18(3), dated May 22, 2009, regarding Application No. GB0604807.8, Applicant Texas Instruments (Cork) Limited.

"How to Design a Transformer With Fractional Turns," Texas Instruments Incorporated, 2003, pp. R6-R8 (Lloyd Dixon Jr.).

* cited by examiner

TRANSFORMER FOR MULTI-OUTPUT POWER SUPPLIES

This invention relates to a transformer for multi-output power supplies comprising a magnetic core and a plurality of windings, at least some of which being fractional windings, arranged about the magnetic core.

It is not uncommon to have transformers that are required to provide a number of output power supplies for use in the operation of electronic equipment. One such example is that found in the standard desk-top power supplies with the "ATX set" of 12 V, 5V, 3.3V and −12V supplies being provided. Typically, an incoming AC mains line voltage i converted into a DC voltage suitable for manipulation in the transformer, and the transformer thereafter transforms the suitable DC voltage into each of the required DC voltage levels. By and large, the required DC voltage levels are obtained by controlling the number of secondary winding turns on the transformer. Normally, it is considered advantageous to provide all of the windings of a transformer on a common magnetic core. This obviates the need to provide a separate transformer for each and every DC voltage required. This can save considerable space on the circuit board thereby facilitating minimization of the circuit board.

However, there are numerous difficulties associated with this approach. First of all, by placing the plurality of windings about a common magnetic core, this can cause difficulties particularly when working with low voltages, as frequently fractional turns are required in order to achieve the desired conversion ratio. Fractional turns may be implemented very simply conceptually using a multi-leg core, typically an X-core, but the practical implementation can pose significant challenges to the designer. These challenges relate primarily to issues associated with maintaining low leakage inductance between the windings as well as managing wide ranges of current that can appear in flux-balancing windings. Leakage inductance can give rise to cross regulation challenges and therefore it can often be quite difficult to provide a suitable transformer for multi-output power supplies using a common magnetic core. It is also desirable in many designs to implement the output stage as a full-duty cycle stage thus facilitating zero voltage switching (ZVS) operation and also maximising transformer utilisation. Again this can be relatively difficult to achieve with known approaches.

It is an object therefore of the present invention to provide a transformer for multi-output power supplies that is relatively simple to construct and relatively inexpensive to manufacture that overcomes at least some of the difficulties with the known implementations of the transformers for multi-output power supplies.

STATEMENTS OF INVENTION

According to the invention there is provided a transformer for multi-output power supplies comprising a magnetic core and a plurality of windings, at least some of which give effect to fractional windings, arranged about the magnetic core, characterised in that the transformer further comprises a dual transformer structure having a main transformer and an auxiliary transformer. By having such a transformer it is possible to use readily available and relatively inexpensive planar-type and other low-profile magnetic cores in the construction of the transformer. This approach allows for a large cross-sectional area to be deployed so that reduced turn counts of windings may be used. Again this simplifies manufacture and construction. Furthermore, it is possible to realise fractional turn ratios by using one transformer as a main transformer and the other transformer as an auxiliary transformer thereby allowing adjustment of the turns ratio used in a relatively simple manner.

In one embodiment of the invention there is provided a transformer in which the main transformer comprises an E-Core. This is seen as a particularly simple configuration of transformer core to use. In another embodiment of the invention there is provided a transformer in which the main transformer comprises a flat core section connected to the E-Core. Again, this is seen as a simple configuration of transformer core to use that will be simple to construct. Alternatively, there is provided a transformer in which the main transformer comprises a second E-Core connected to the first E-Core.

In one embodiment of the invention there is provided a transformer in which the auxiliary transformer comprises an E-Core. In another embodiment of the invention there is provided a transformer in which the auxiliary transformer comprises a flat core section connected to the E-Core. In a further embodiment of the invention there is provided a transformer in which the auxiliary transformer comprises a second E-Core connected to the first E-Core.

In one embodiment of the invention there is provided a transformer in which the auxiliary transformer is mounted back-to-back on the main transformer. Preferably, the auxiliary transformer is mounted back-to-back on the main transformer. Alternatively, the transformer is mounted on a circuit board and the main transformer and the auxiliary transformer are mounted end to end. Essentially therefore, the existing configuration of windings may be used but in a flat configuration.

In another embodiment of the invention there is provided a transformer in which the auxiliary transformer is mounted back-to-back on the main transformer and in which the main transformer comprises an E-core connected to a flat core section and the auxiliary transformer comprises a second E-core connected to one of the E-core and the flat core section of the main transformer.

In one embodiment of the invention there is provided a transformer in which the main transformer comprises an E-core connected to a flat core section and the auxiliary transformer comprises a second E-core connected to one of the E-core and the flat core section of the main transformer. By having the E-core connected to the flat core section and the second E-core connected to one of the E-core and the flat core section, it is possible to use a common centre section which may provide volumetric and constructional advantages to the transformer. The transformer will take up less area on the printed circuit board (PCB) when placed on the PCB. As an alternative to a flat core section, a further E-core could be provided connected to the E-core of the main transformer.

In another embodiment of the invention there is provided a transformer in which the auxiliary transformer further comprises a second flat core section connected to the second E-core of the auxiliary transformer, and one of the second flat core section and the second E-core of the auxiliary transformer is mounted on one of the E-core and the flat core section of the main transformer. This is seen as a particularly simple construction of transformer and may be manufactured in a simple and efficient manner. The flat core section of the main transformer and/or the flat core section of the auxiliary transformer each may be substituted by a further E-core connected to the existing E-core in that transformer.

In a further embodiment in the invention there is provided a transformer in which the flat core section of the main transformer and the second flat core section of the auxiliary transformer are formed from a single plate of magnetic material.

In one embodiment of the invention there is provided a transformer in which the windings are provided by way of foil sections. Alternatively, the windings may be provided by way of stamping sections. In another embodiment still the windings may be provided by way of wire assemblies. In a further still embodiment, the windings may be provided by way of rigid or alternatively flexible PCB implementations.

In another embodiment of the invention there is provided a transformer in which the transformer is mounted directly on a printed circuit board (PCB) and the windings are connected directly into the PCB. This is seen as a particularly simple way of mounting the transformer on a PCB. Alternatively, the windings may be connected to the PCB via termination wires. The termination wires are seen to be useful as the precise connection point of the windings on the board may be varied as required by placement needs.

In a further embodiment of the invention there is provided a transformer in which there is provided a daughter PCB mounted on the transformer magnetic core having at least one electronic component thereon. Preferably, the electronic component mounted on the daughter PCB will comprise a synchronous rectifier switch mounted on the daughter PCB. It is envisaged that this synchronous rectifier switch will be provided by way of a MOSFET. This is seen as a particularly simple and useful implementation of transformer. In this way, low inductance connections may be established between the switching elements and the windings, and there will also be close thermal couplings between the magnetic elements, typically ferrite, and the semi-conductor elements. In the case of a quasi full-duty cycle implementation, the output inductor values are very small and this construction can facilitate being able to incorporate them into the overall assembly.

In one embodiment of the invention there is provided a transformer in which the plurality of windings comprise approximate mirror images of each other. By having the plurality of windings as an approximate mirror image of each other it is possible to manufacture the windings in a very simple manner.

In another embodiment of the invention there if provided a transformer in which there are provided a pair of secondary output windings, one of which being a 12V winding and the other being a 5V winding. It is envisaged that the 12V winding and the 5V winding are double-ended windings provided with centre-tapped outputs.

In a further embodiment in the invention there is provided a transformer in which the 12V winding is implemented by tapping the winding at a 5V point, drawing the winding through the auxiliary transformer with 5 turns at 2V per turn, and thereafter drawing the winding through the E-core of the main transformer. This is a particularly simple configuration of transformer that will be simple and inexpensive to construct.

In one embodiment of the invention there is provided a transformer in which the 12V winding is connected to a 5VA terminal and a 5VB terminal on the PCB. It will be understood that the nomenclature used in relation to 5VA and 5VB refers to the different phases of the 5V taken from a centre tapped transformer winding. There will be a different phase of 5V on either side of the centre tap and these are referenced separately as 5VA and 5VB respectively.

In another embodiment of the invention there is provided a transformer in which there is provided a further half turn winding for the 5VA and 5VB voltages on the opposite transformer portion to which they are mounted to provide a balanced transformer.

In a further embodiment of the invention there is provided a transformer in which the further half winding is provided by a winding mounted on the exterior of the main transformer. Alternatively, the further half winding may be placed between the main transformer and the auxiliary transformer.

In one embodiment of the invention there is provided a transformer in which the transformer primary winding is configured to operate at 10V per turn. It is envisaged that the transformer primary winding will be mounted in the main transformer section only.

In another embodiment of the invention there is provided a transformer in which the winding on the auxiliary transformer is tapped using an 0V connection and there is provided a flux balancing winding on the auxiliary core to provide an additional output voltage. This is seen as particularly useful as additional output voltages may be required on the transformer. For example, it would be possible to provide the full ATX set on the one transformer core by implementing such a transformer construction. It is envisaged that the flux balancing winding on the auxiliary transformer comprises a 2+2 (2 turns at 2 volts per turn) winding thereby giving a 4V output. By having a 4V output it would be possible to derive a 3.3V output for use in the common ATX set in a relatively simple manner.

In a further embodiment of the invention there is provided a transformer in which there are provided a plurality of windings on the transformer mounted in parallel with respect to each other. In this way, the individual, physical windings are placed side by side, stacked parallel to each other about the core. This is seen as particularly useful as this will facilitate reduction of conduction losses and/or reduction of inter-winding leakage inductance. Reduced leakage inductance will minimise spiking on rectifiers and also aids cross-regulation in the transformer.

DETAILED DESCRIPTION OF THE INVENTION

The invention will now be more clearly understood from the following description of some embodiments thereof, given by way of example only with reference to the accompanying drawings, in which:—

Figure 1:
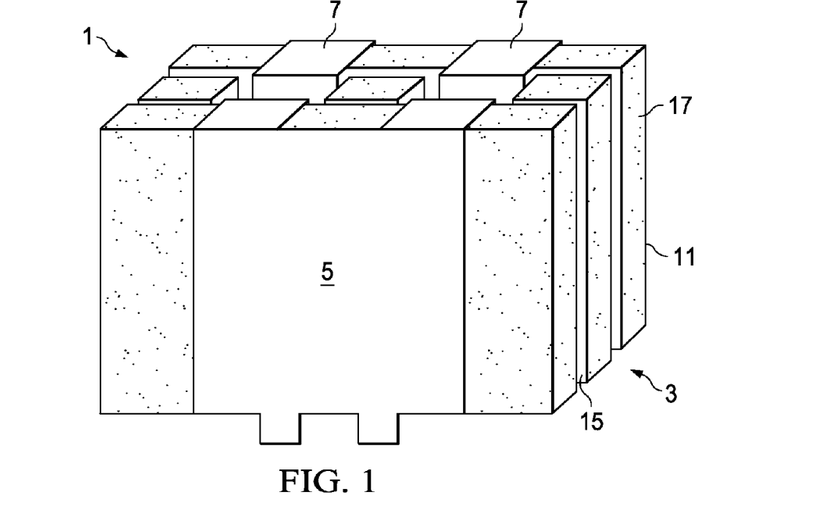
FIG. 1 is a front perspective view of a transformer for multi-output power supplies according to the invention.
Figure 2:
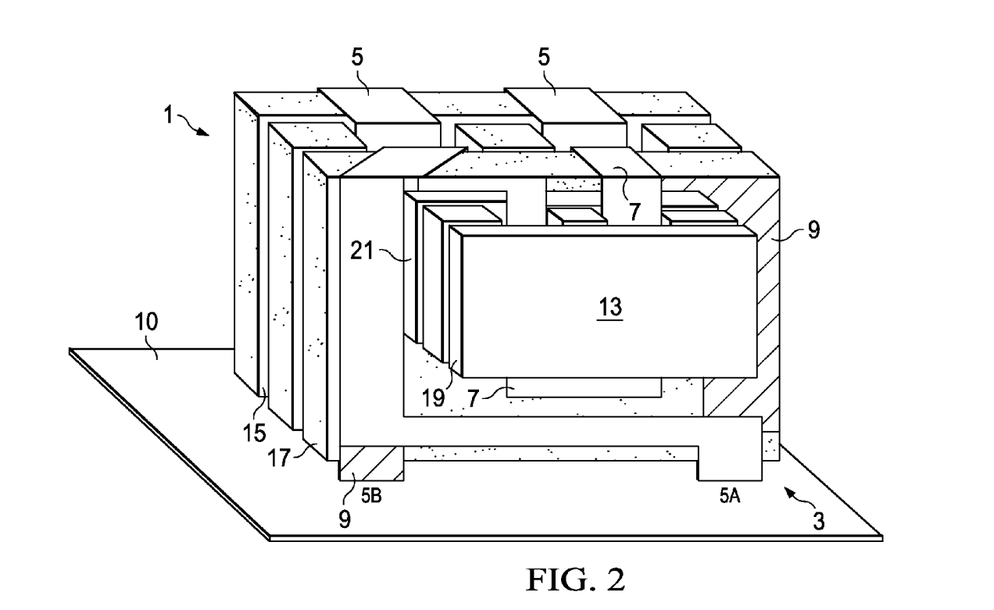
FIG. 2 is rear perspective view of the transformer shown in FIG. 1.

Referring to the drawings and initially to FIGS. 1 and 2 thereof, there is shown a transformer, indicated generally by the reference numeral 1, for multi-output power supplies comprising a magnetic core 3 and a plurality of windings 5, 7, 9 arranged about the magnetic core 3. The transformer further comprises a dual transformer structure having a main transformer 11 and an auxiliary transformer 13, the auxiliary transformer 13 being mounted back-to-back (core to core) on the main transformer 11. The main transformer comprises an E-core 15 connected to a flat core section 17. The auxiliary transformer comprises a second E-core 19 connected to a second flat core section 21 which in turn is connected to the first flat core 17 of the main transformer 11. The windings 5, 7, 9 are formed by way of foil sections and are mounted directly onto a printed circuit board (PCB) 10. The winding 7 Is a 12V winding implemented by tapping the winding at a 5V point, and drawing the winding through the auxiliary transformer 13, using 5 turns at 2V per turn, and hereafter drawing the winding 7 through the E-core 15 of the main transformer II. In order to operate the transformer in a balanced fashion, a further half turn winding (not shown) for the 5VA and 5VB voltages needs to be provided through the opposite leg and this can be provided by way of the stamping winding 5A and 5B shown on the front of the transformer 1.

Figure 3:
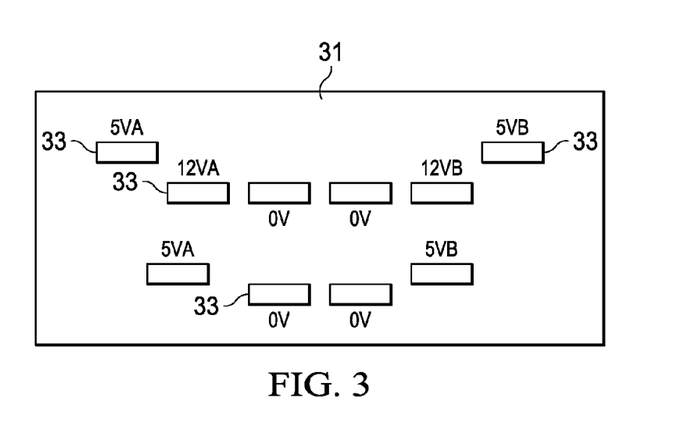
FIG. 3 is a diagrammatic representation of the outline footprint of the transformer of FIGS. 1 and 2.

Referring to FIG. 3 of the drawings there is shown an outline footprint of the transformer on a PCB 31. A plurality of sockets 33 are provided for termination of each of the windings. As an alternative to providing sockets 33 in this manner, it is also possible to provide termination wires so that the connection points may be varied to allow more flexibility in the mounting of the transformer on the PCB.

Figure 4:
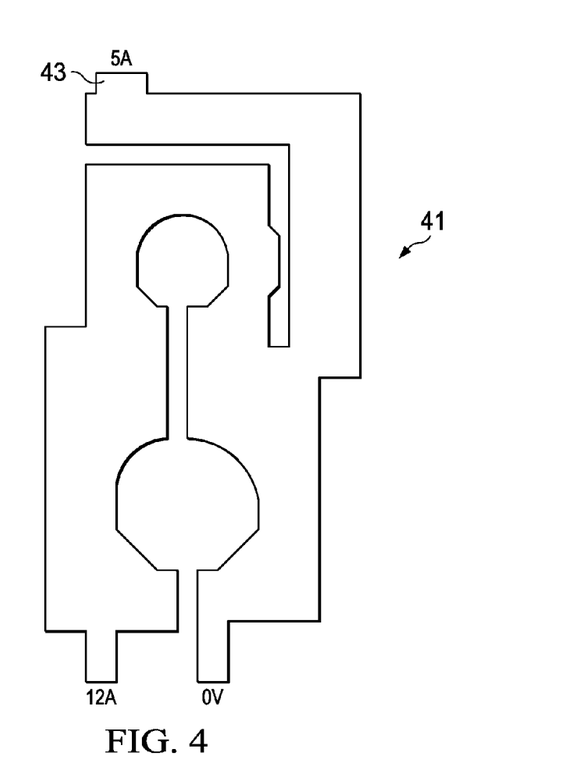
FIG. 4 is a plan view of a 12V winding.

Referring now to FIG. 4 of the drawings there is shown a transformer winding, indicated generally by the reference numeral 41, suitable for use in the transformer according to the invention. The transformer winding 41 is a winding suitable for implementing a 12V and 5V centre-tapped output winding. A second 12V winding provided for the transformer will effectively be a mirror image of the winding shown however there may be some alteration in the size of the apertures for suitable mountings of the foil about the magnetic structure. The winding 41 is tapped initially at the 5V point 43 before it is led through an auxiliary transformer at 2V per turn before being returned through the remaining E-section of the main transformer. It will be readily understood from the foregoing that other windings with different voltage ratings for the windings may also be provided and the person skilled in the art, with knowledge of the present invention would readily understand what is required to provide windings with different winding voltage ratings. In particular, it would be evident from the foregoing to the skilled addressee how to construct windings for a full ATX set if desired.

Figure 5:
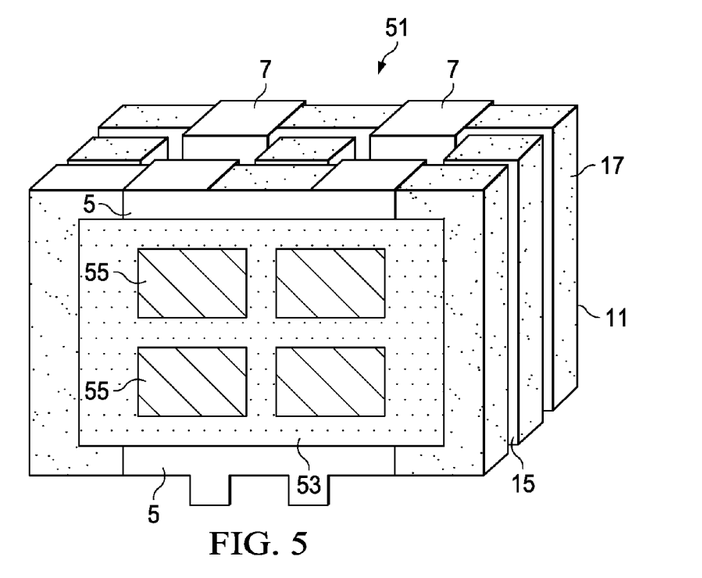
FIG. 5 is a front perspective view of an alternative construction of transformer according to the invention.

Referring to FIG. 5 of the drawings there is shown an alternative embodiment of transformer, indicated generally by the reference numeral 51, where like parts have been given the same reference numerals as before. The transformer 51 further comprises a daughter PCB 53 mounted on the main transformer 11. The daughter PCB 53 has a plurality of active switching devices, in this case synchronous rectifier MOSFETs 55 mounted thereon. In this way, low inductance connections may be established between the switching devices and the windings and it is possible to derive benefits from close thermal coupling between the magnetic element, typically ferrite, and the semi-conductor elements. In the case of a quasi full-duty cycle implementation, the output inductor values are very small and this can facilitate being able to incorporate them with the overall assembly.

In the embodiments shown, the transformer is able to provide a 12V and a 5V supply. It must be understood that it is also possible to provide a 3.3V supply also. This may be achieved by putting an additional 2+2 turn winding on the auxiliary transformer section, as shown by elements 817, 819 of FIG. 8. This will give a 4V output from the transformer. For supplying a 3.3V output at the end of a cable, such a voltage (4V) may be appropriate and gives optimal head room for magnetic amplifier (magamp) approaches. This allows for the transformer to derive a voltage suitable for regulation by magamp approaches. Furthermore, it is envisaged that the transformer may be operated in a balanced fashion by providing a further half turn winding for the 5VA and 5VB voltages through the opposite leg and this may be provided by the foil/stamping winding shown on the front of the assembly. Alternatively, it may be possible to place this half turn winding between the two transformer sections 11, 13 or another convenient location as would be understood.

Figure 8:
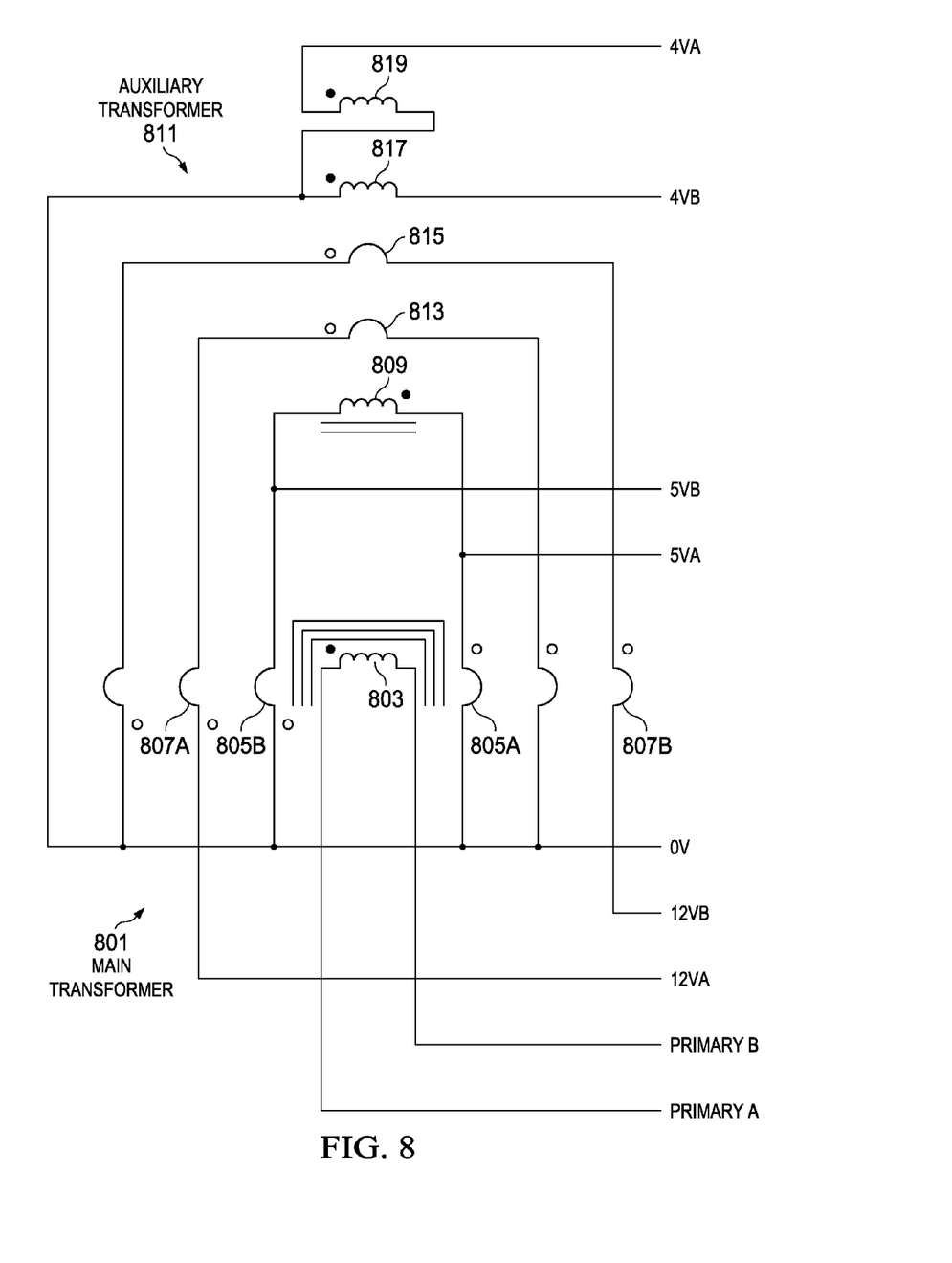
FIG. 8 is a schematic drawing of a transformer in accordance with this invention.
Figure 9:
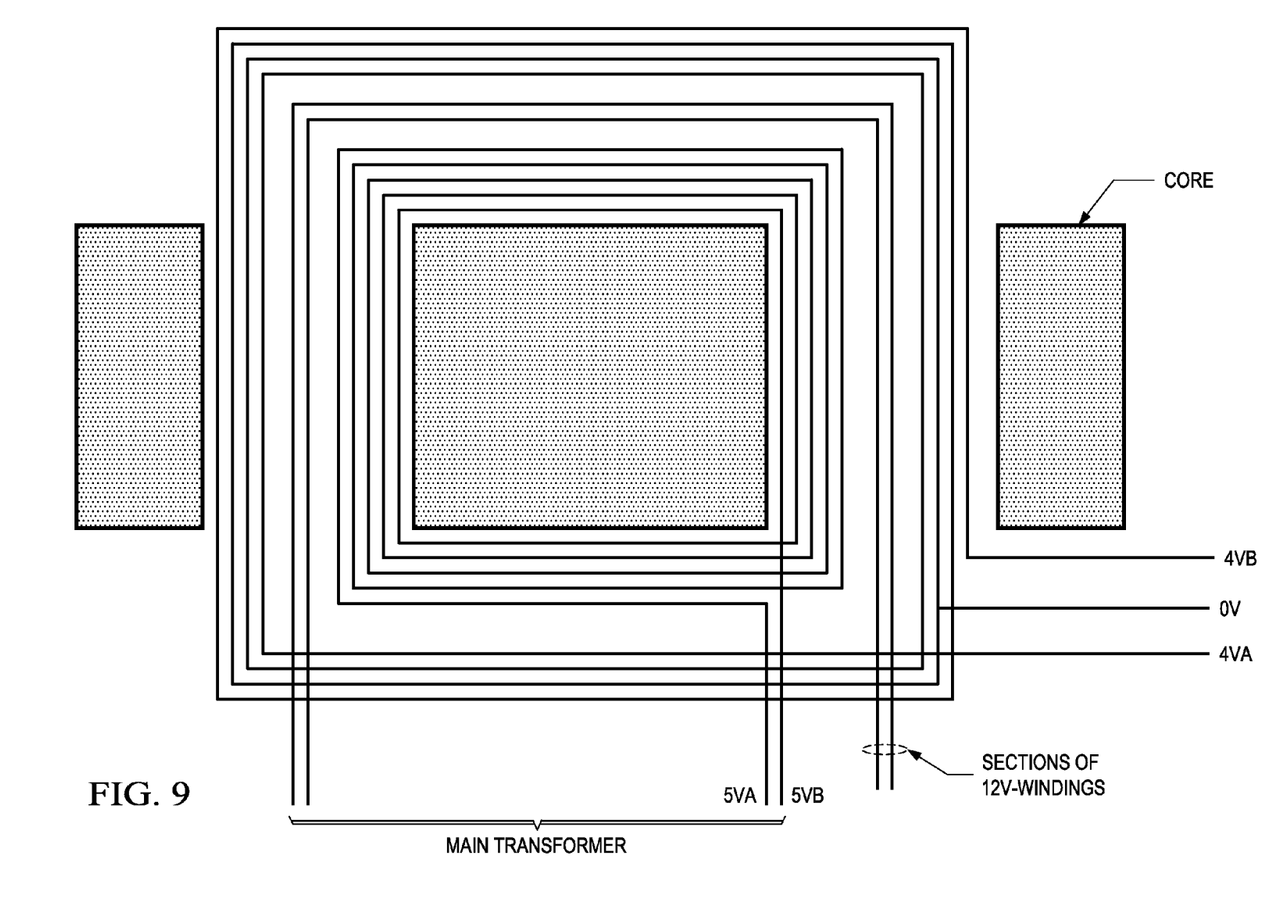
FIG. 9 is a drawing showing the physical layout of the windings of the auxiliary transformer of FIG. 8.

FIG. 8 shows a schematic diagram of the above described transformer. In FIG. 8, the main transformer 801 has a primary winding 803, 5V secondary windings 805A, 805B coupled to outputs 5A and 5B. 12V secondary outputs 12A, 12B are connected to windings 807A, 807B, 813, and 815. The primary winding 809 of auxiliary transformer 811 is connected to the two 5V windings 805A, 805B which are in series to generate 10V. Secondary windings 813, 815 provide a single turn at the above-stated 2V per turn to generate the 12V output. FIG. 9 is a drawing of the physical layout of the auxiliary transformer, as described above.

Finally, although only one key winding set has been shown in the embodiments provided, it is envisaged that it may be preferable to provide a plurality of winding sets arranged parallel to each other in order to give reduced conduction loss and/or reduced interwinding leakage inductance. Essentially what is provided is a multilayer/foil PCB set. Reduced inductance will result in a minimisation of the spiking on rectifiers and will aid cross-regulation in the transformer.

Figure 6:
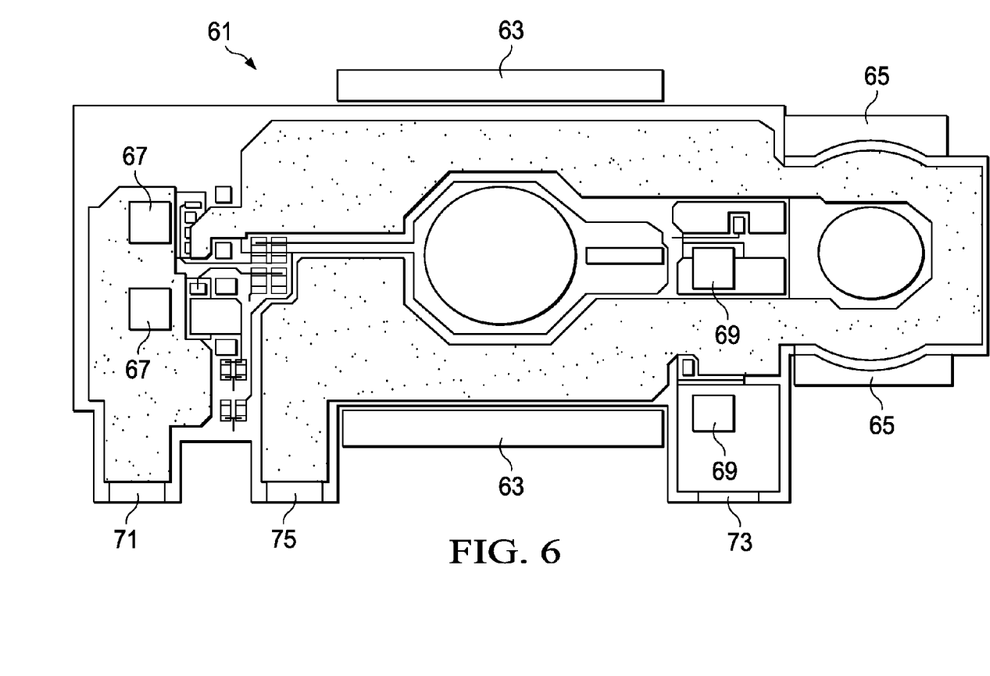
FIG. 6 is a plan view of an alternative construction of winding used in the transformer according to the present invention.

Referring to FIG. 6 of the drawings, there is shown a plan view of an alternative construction of winding used in the transformer according to the present invention. This alternative implementation can use printed circuit boards, which effectively provide foil interleaving and also allow placement of the switches on the printed circuit boards. In this case it may be more logical to have the printed circuit boards in one plane, with the windings effectively "unfolded". A typical printed circuit board, indicated generally by the reference numeral 61, is shown in FIG. 6. The PCB 61 is shown mounted on portion of a main transformer 63 and a portion of an auxiliary transformer 65. A plurality of switches 67, 69 are provided for the 12V supply and the 5V supply respectively. The PCB further comprises a switched 12V terminal 71, a switched 5V terminal 73 and a 0V terminal 75.

Figure 7:
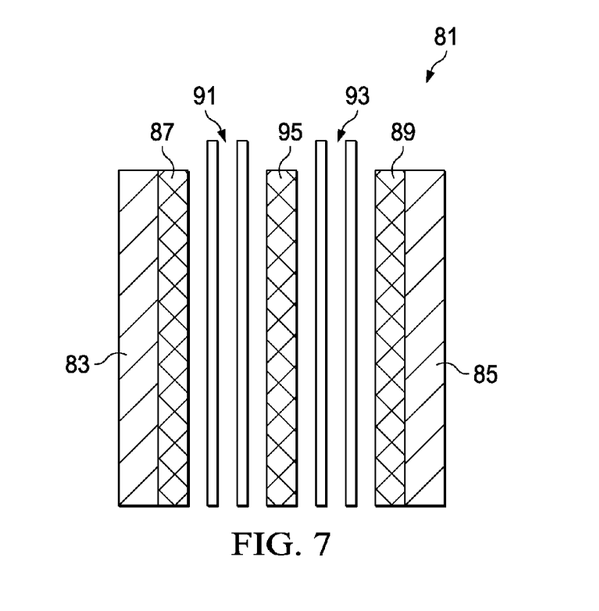
FIG. 7 is a side cross-sectional view of a transformer according to the present invention.

Referring to FIG. 7 of the drawings, there is shown a cross-sectional view of a transformer construction, indicated generally by the reference numeral 81, utilising the printed circuit board implementation in FIG. 6. The transformer comprises a pair of ferrite core sections 83, 85, a pair of main PCBs 87, 89, a pair of wire spirals 91, 93 and a balancing PCB 95. The main PCBs typically have switches provided thereon (not shown). The balancing PCB, wire spirals, main PCBs and ferrite core sections are arranged in a sandwich configuration. The balancing PCB 95 is located in the centre of the construction and has a wire spiral 91, 93 on either side thereof. Outside the wire spirals 91, 93 are the main PCBs 87, 89, one on either side of the balancing PCB 95 and finally the ferrite core sections 83, 85 are provided outside the main PCBs 87, 89 respectively, again, one on either side of the balancing PCB 95. The flux-balancing board performs the similar function as described, with a winding on each outer post of the main core connected such that the flux excursions are equal.

In this specification, both the main and the auxiliary transformers have been shown to comprise an E-core connected to a flat core section. Thereafter, the flat core section of the main transformer has been connected to the flat core section of the auxiliary transformer. It will be understood that instead of using a flat core section in either the main transformer or the auxiliary transformer, it is possible to use a further E-core section in the main transformer and/or the auxiliary transformer connected to the original E-core section with the arms of the E-core sections being connected together. Similarly, in the embodiments shown, the connection between the main and auxiliary transformers has been shown with the flat core sections connected together but equally well two E-core sections could be connected back-to-back or an E-core section of one of the main transformer and the auxiliary transformer could be connected to a flat core section of the other of the main transformer and the auxiliary transformer if desired.

Furthermore, it will be understood that the phrase "give effect to fractional windings" means that the transformers do not necessarily have to have fractional windings but rather may have full turn windings. The windings "give effect to" fractional windings by the full windings on one transformer affecting the full windings on the other transformer to give a voltage equivalent to one obtained if a fractional winding had been used instead. Of course, it is also possible to provide fractional windings if need be.

In this specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail within the scope of the claims.

The invention claimed is:

1. A transformer operating at a single frequency for multiple voltage output power supplies comprising a magnetic core and a plurality of windings, at least some of which give effect to fractional windings, arranged about the magnetic core, wherein the transformer further comprises a dual transformer structure having a main transformer on a first core and an auxiliary transformer on a second core not magnetically coupled to the first core, at least one secondary winding of the main transformer being coupled to a primary winding of the auxiliary transformer, wherein voltage on the at least one secondary winding of the main transformer is an input voltage to the primary winding of the auxiliary transformer, and at least one secondary winding of the auxiliary transformer being coupled to a secondary winding of the main transformer to generate one of the multiple voltage outputs, wherein the effect of fractional windings is provided without utilizing fractional windings.

2. A transformer as claimed in claim 1 in which at least one of the main transformers and auxiliary transformers comprise an E-Core.

3. A transformer as claimed in claim 2 in which the at least one transformers comprises a flat core section connected to the E-Core.

4. A transformer as claimed in claim 2 in which the at least one transformer comprises a second E-Core connected to the first E-Core.

5. A transformer as claimed in claim 1 in which the auxiliary transformer is physically, but not magnetically, mounted core-to-core on the main transformer.

6. A transformer as claimed in claim 5 in which the main transformer comprises an E-core connected to a flat core section and the auxiliary transformer comprises a second E-core physically, but not magnetically, connected to one of the E-core and the flat core section of the main transformer.

7. A transformer as claimed in claim 6 in which the auxiliary transformer further comprises a second flat core section connected to the second E-core of the auxiliary transformer, and one of the second flat core sections and the second E-core of the auxiliary transformers are mounted physically, but not magnetically, on one of the E-core and the flat core section of the main transformer.

8. A transformer as claimed in claim 7 in which the flat core section of one of the main and auxiliary transformers is substituted by a further E-core connected to the second E-core of the other main auxiliary transformers.

9. A transformer as claimed in claim 1 in which the transformer is mounted on a circuit board and the main transformer and the auxiliary transformer are mounted end to end.

10. A transformer as claimed in claim 1 in which the windings are provided by way of foil sections.

11. A transformer as claimed in claim 10 in which the transformer is mounted directly on a printed circuit board (PCB) and the windings are connected directly onto the PCB.

12. A transformer as claimed in claim 11 in which there is provided a daughter PCB mounted on the transformer magnetic core having at least one electronic component thereon.

13. A transformer as claimed in claim 12 in which there is provided at least one synchronous rectifier switch mounted on the daughter PCB.

14. A transformer as claimed in claim 13 in which the synchronous rectifier switch is a MOSFET.

15. A transformer as claimed in claim 1 in which the plurality of windings comprise approximate mirror images of each other.

16. A transformer as claimed in claim 1 in which there are provided a pair of windings, one of which being a 12V winding and the other being a 5V winding.

17. A transformer as claimed in claim 16 in which the 12V winding and the 5V winding are windings provided with centre tapped outputs.

18. A transformer as claimed in claim 16 in which the 12V winding is implemented by tapping the winding at a 5V point, drawing the winding through the auxiliary transformer with 5 turns at 2V per turn, and thereafter drawing the winding through the E-core of the main transformer.

19. A transformer as claimed in claim 18 in which the 12V winding is connected to a 5VA terminal and a 5VB terminal on a PCB; and in which there is provided a further half turn winding for the 5VA terminal and a 5VB voltages on the opposite transformer portion to which they are mounted to provide a balanced transformer.

20. A transformer as claimed in claim 19 in which the further half turn winding is provided by a winding mounted on the exterior of the main transformer, or is placed between the main transformer and the auxiliary transformer.

21. A transformer as claimed in claim 1 in which the transformer primary winding is configured to operate at 10V per turn.

22. A transformer as claimed in claim 1 in which the winding on the auxiliary transformer is tapped using a 0V connection and there is provided a flux balancing winding on the auxiliary core to provide an additional output voltage.

23. A transformer as claimed in claim 22 in which the flux balancing winding on the auxiliary transformer comprises a winding having 2 turns at 2V per turn thereby giving a 4V output.

* * * * *